US011763302B2

(12) United States Patent
Fieglein et al.

(10) Patent No.: US 11,763,302 B2
(45) Date of Patent: Sep. 19, 2023

(54) METHODS AND DEVICES FOR MOBILE PAYMENT TRANSACTIONS WITH A PRODUCT DISPENSER

(71) Applicant: Wayne Fueling Systems LLC, Austin, TX (US)

(72) Inventors: Henry Fieglein, Leander, TX (US); Eli Pulsifer, Austin, TX (US); Richard Carlsson, Malmo (SE)

(73) Assignee: Wayne Fueling Systems LLC, Austin, TX (US)

( * ) Notice: Subject to any disclaimer, the term of this patent is extended or adjusted under 35 U.S.C. 154(b) by 242 days.

(21) Appl. No.: 17/155,704

(22) Filed: Jan. 22, 2021

(65) Prior Publication Data

US 2021/0217009 A1 Jul. 15, 2021

Related U.S. Application Data

(63) Continuation of application No. 15/888,663, filed on Feb. 5, 2018, now Pat. No. 10,902,422.

(51) Int. Cl.
*G06Q 40/00* (2023.01)
*G06Q 20/40* (2012.01)
(Continued)

(52) U.S. Cl.
CPC ......... *G06Q 20/401* (2013.01); *G06Q 20/325* (2013.01); *H04L 67/141* (2013.01); *H04L 67/146* (2013.01)

(58) Field of Classification Search
USPC ......... 705/39, 37, 38, 40; 709/227; 726/9, 6; 700/232; 235/384; 701/29.6
See application file for complete search history.

(56) References Cited

U.S. PATENT DOCUMENTS 9,276,910 B2 * 3/2016 Tang .................... G06Q 20/204
9,582,792 B2 * 2/2017 Bonk ................. G06Q 20/3224
(Continued)

FOREIGN PATENT DOCUMENTS

CN          105556553 A      5/2016
WO     WO-2015009765 A1     1/2015
(Continued)

OTHER PUBLICATIONS

M-Payment systems: Technologies and business models; 2014 Euro Med Telco Conference (EMTC) (pp. 1-6); Alessandro Vizzarri, Francesco Vatalaro; Nov. 12, 2014. (Year: 2014).*
(Continued)

*Primary Examiner* — Tien C Nguyen
(74) *Attorney, Agent, or Firm* — MINTZ LEVIN COHN FERRIS GLOVSKY AND POPEO, PC (57) ABSTRACT

Various exemplary methods and devices for product dispenser electronic communication with a mobile device are provided. In general, a mobile device can request a secure connection with a product dispenser detected in the proximity of the mobile device. The mobile device can transmit request data to a network cloud server to authorize a mobile payment application executed on the mobile device, and can receive response data from the network cloud server indicating that the payment application has been authorized to process a payment for a product dispensable from the product dispenser. The mobile device and the product dispenser establish a secure connection using a secure key included in the response data, regardless of whether or not the product dispenser has established a connection with a network cloud server.

20 Claims, 8 Drawing Sheets

(51) Int. Cl.
*G06Q 20/32* (2012.01)
*H04L 67/146* (2022.01)
*H04L 67/141* (2022.01)

(56) References Cited

U.S. PATENT DOCUMENTS

| | | | |
|---|---|---|---|
| 9,811,801 B2* | 11/2017 | Gulli | G06Q 10/0631 |
| 10,902,422 B2 | 1/2021 | Fieglein et al. | |
| 2003/0028297 A1* | 2/2003 | Iihoshi | G07C 5/008 |
| | | | 701/29.6 |
| 2005/0192832 A1* | 9/2005 | Call | G06Q 20/085 |
| | | | 235/384 |
| 2006/0004485 A1* | 1/2006 | Thomas | G07F 13/025 |
| | | | 700/232 |
| 2008/0235105 A1* | 9/2008 | Payne | G06Q 30/0633 |
| | | | 705/26.8 |
| 2013/0246171 A1* | 9/2013 | Carapelli | G06Q 20/325 |
| | | | 705/14.51 |
| 2014/0172157 A1 | 6/2014 | Bellamy, III et al. | |
| 2014/0337234 A1 | 11/2014 | Tang et al. | |
| 2015/0088738 A1* | 3/2015 | Cateland | G06Q 20/227 |
| | | | 705/41 |
| 2015/0106196 A1 | 4/2015 | Williams et al. | |
| 2016/0048835 A1 | 2/2016 | Mutha | |
| 2016/0086163 A1* | 3/2016 | Hosny | G06Q 20/202 |
| | | | 705/21 |
| 2016/0171253 A1 | 6/2016 | Williams et al. | |
| 2017/0035588 A1 | 2/2017 | Sheldon et al. | |
| 2017/0109722 A1* | 4/2017 | Morris | G06Q 20/3278 |
| 2017/0278088 A1* | 9/2017 | Vixamar | G06Q 20/102 |
| 2017/0355588 A1 | 12/2017 | Fieglein | |
| 2019/0389718 A1* | 12/2019 | Patil | G06Q 20/4014 |

FOREIGN PATENT DOCUMENTS

| | | |
|---|---|---|
| WO | WO-2015017308 A1 | 2/2015 |
| WO | WO-2015095599 A1 | 6/2015 |

OTHER PUBLICATIONS

Design of Embedded Based Dual Identification ATM Card Security System; 2019 9th International Conference on Emerging Trends in Engineering and Technology—Signal and Information Processing (ICETET-SIP-19) (pp. 1-5); Priyanka Hemant Kale K. K. Jajulwar; Nov. 1, 2019. (Year: 2019).*

A 2D Barcode-Based Mobile Payment System; 2009 Third International Conference on Multimedia and Ubiquitous Engineering (pp. 320-329); Gao, J. Kulkarni, V. Ranavat, H., Lee Chang, Hsing Mei, Jun. 1, 2009.

International Search Report and Written Opinion for PCT/US2019/016647 dated May 20, 2019 (11 pages).

U.S. Appl. No. 15/888,663, U.S. Pat. No. 10,902,422, filed Feb. 5, 2018, Henry Fieglein et al.

Extended European Search Report for EP App. No. 1974568.5 dated Sep. 6, 2021 (8 pages).

* cited by examiner

METHODS AND DEVICES FOR MOBILE PAYMENT TRANSACTIONS WITH A PRODUCT DISPENSER

CROSS REFERENCE TO RELATED APPLICATIONS

This application is a continuation of U.S. patent application Ser. No. 15/888,663, filed on Feb. 5, 2018, now U.S. Pat. No. 10,902,422, entitled "Methods and Devices for Mobile Payment Transactions with a Product Dispenser," which is hereby incorporated by reference in its entirety.

FIELD

The present disclosure relates generally to methods and devices for product dispenser electronic communication and in particular to payment transactions performed via a mobile device for payment for products dispensable from a product dispenser.

BACKGROUND

Various product dispensers exist that can dispense products. For example, the retail petroleum industry utilizes various types of fuel dispensers for dispensing fuel to customers. Some form of a remote dispenser controller is traditionally used for controlling the actual dispensing of fuel by the fuel dispensers. The dispenser controller is often on the same premises as the fuel dispensers and coupled to a store interface unit so that a site attendant can monitor and control particular fueling dispensers from a building at the site (e.g., a gas station or other store). The dispenser controller sends data signals to the fuel dispensers providing various information and commands thereto. The information traditionally includes price, preset amounts of fuel to dispense, and authorization to dispense fuel. The fuel dispensers likewise send data signals to the dispenser controller, traditionally including pump number, pump status, dispensed fuel volume, and sale value.

A Point of Sale (POS) system, such as an in-store POS terminal or a payment module embedded in a fuel dispenser, is traditionally used to control the payment functionality of the fuel dispenser. The POS system is often on the same site as the fuel dispensers and sends data signals to the fuel dispensers providing various information and commands thereto. The information traditionally includes user prompting controls, graphics, and media for display on the fuel dispenser's display screen. The fuel dispensers likewise send data signals to the POS system, traditionally including pump number, prompt status, transaction data, and sale value.

As mobile payments become more widespread, the POS system can accept mobile payments for fuel and other goods/services. Conventionally, in order to authorize a mobile payment transaction, fuel dispensers communicate with the POS system in order to complete a fuel purchase transaction. The POS system can operate as an intermediary between a fuel dispenser and a remote source, such as network cloud, hosting network cloud fuel management services. However, an existing infrastructure for mobile payments with the POS system (e.g., at a fueling service station) is cumbersome, such that customers typically find it inconvenient to perform payment for fuel and other goods/services at the POS system. Moreover, while many customers prefer to remain outside during fueling, to be able to pay for the transaction using their mobile device, the customers are required to enter the store (e.g., the fueling service station) to complete the fuel purchase transaction.

Alternatively, the fuel dispenser can be enabled to directly communicate with a network cloud to authorize mobile payments. Regardless of whether the fuel dispenser communicates with the network cloud directly or via an onsite dispenser controller (e.g., the POS system) communicatively coupled to the dispenser, the network cloud is required to transmit mobile payment authorization information to the fuel dispensing site, such as directly to the dispenser or to the dispenser controller. This creates a security risk since inbound traffic must be allowed to access the fuel dispensing site, thereby subjecting secure data (e.g., payment details, customer personal identification number (PIN), etc.) to potential fraudulent access. Also, continuous connectivity between the network cloud and the fuel dispenser and/or the POS system is required for fuel purchase transactions to occur. Moreover, only certain types of payment are typically accepted via the POS system, which limits payment options available to customers.

Accordingly, there remains a need for improved methods and devices for fuel dispenser electronic communication for performing payment transactions.

SUMMARY

In general, methods and devices for product dispenser electronic communication are provided. In particular, methods and devices for performing, via a mobile device, payment transactions for products dispensable from the product dispenser, are provided.

In one aspect, a mobile device is provided that in one embodiment includes a communication mechanism and a processor. The communication mechanism is configured to detect a product dispenser in proximity to the mobile device. The processor is configured to transmit, via the communication mechanism, a request to establish a secure connection with the product dispenser. The processor is configured to transmit to a network cloud server, via a wireless connection, request data requesting authorization of a payment application of the mobile device, and the processor is also configured to receive from the network cloud server, via the wireless connection, response data indicating that the payment application has been authorized to process a payment for a product dispensable from the product dispenser.

The mobile device can have any number of variations. For example, the payment application can include a payment authorization module configured to generate the request data and to receive the response data. In at least some embodiments, the payment authorization module can be generated using a software development kit (SDK) library of the payment application.

As another example, the payment application can be configured to provide a user interface on a display of the mobile device. For yet another example, the communication mechanism can be configured to receive from the product dispenser identification data that uniquely identifies the product dispenser, and the request data includes the identification data.

For another example, the communication mechanism can include a wireless transceiver configured to establish a secure connection between the mobile device and the product dispenser. In at least some embodiments, the wireless transceiver can be a Bluetooth Low Energy (BLE) transceiver.

For still another example, the mobile device can further include a second communication mechanism configured to establish the wireless connection between the mobile device and the network cloud server.

For another example, the response data can include a secure key that the processor can be configured to use in secure communication between the mobile device and the product dispenser. In at least some embodiments, the processor can be configured to use the secure key to decrypt encrypted data (e.g., status data indicative of at least one of a current status of the product dispenser and an amount of product that has been dispensed via the product dispenser) received from the product dispenser via the secure connection, and/or the processor can be configured to use the secure key to encrypt payment data that is indicative of a total amount of payment for the product dispensable from the product dispenser and the processor can be configured to transmit the encrypted payment data to the product dispenser.

For another example, the mobile device can include a device integrated into an automotive vehicle. For yet another example, the mobile device can include one of a phone, a tablet, a laptop, and a smartwatch.

For still another example, the processor can be configured to process the payment in association with a customer loyalty program that is not associated with a merchant providing the product dispenser. For another example, the processor can be configured to process the payment in association with a customer loyalty program that is associated with a merchant providing the product dispenser.

For yet another example, the product can be fuel, and the product dispenser can be a fuel dispenser. For still another example, the product can be one of a consumable including one of drinking liquid, electricity, air, lottery tickets, and food.

In another aspect, a method of using a product dispenser is provided that in one embodiment includes receiving at a product dispenser via a wireless communication link a request from a mobile device to establish a secure connection between the product dispenser and the mobile device, and, after the request to establish the secure connection is received, receiving from the mobile device, via the wireless communication link, a secure key for secure communication between the product dispenser and the mobile device. The method also includes establishing the secure connection between the product dispenser and the mobile device. The secure connection allows communication between the product dispenser and the mobile device using the secure key. The method also includes, in response to receiving an authorized amount of payment for a product from the mobile device, causing the product to be dispensed from the product dispenser. The authorized amount of payment is encrypted using the secure key.

The method can have any number of variations. For example, the method can include, prior to receiving from the mobile device the secure key and in response to the receipt of the request to establish the secure connection, transmitting to the mobile device identification data that uniquely identifies the product dispenser. For another example, the secure key can be received by the product dispenser regardless of whether or not the product dispenser has established a connection with a network cloud server. For yet another example, the method can include transmitting from the product dispenser to the mobile device, via the established secure connection, status data indicative of a current status of the product dispenser. In at least some embodiments, the wireless communication link can include a BLE transceiver.

BRIEF DESCRIPTION OF DRAWINGS

The present disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various exemplary methods and devices for product dispenser electronic communication are provided. In general, a product dispenser can be configured to communicate with a mobile device when the mobile device is in proximity to the product dispenser. The mobile device can have a communication mechanism, such as a wireless transceiver, that is configured to detect the product dispenser in proximity to the mobile device. The mobile device can have a payment application that allows use of the mobile device to pay for products dispensable from the product dispenser. The payment application can electronically communicate with a mobile payment provider that processes payments performed via the mobile device. The mobile device can be configured to electronically communicate with a network cloud server to access cloud authorization services. In particular, the mobile device can access, via a wireless connection, the network cloud server to request authorization of the payment application of the mobile device, which is performed regardless of whether or not the product dispenser has established a connection with the network cloud server. Once a response to the request is received at the mobile device, the payment application can be configured to communicate with the product dispenser regarding the dispenser's dispensing of the product and regarding a payment for the product via the mobile device. Thus, a payment for a product dispensable from the product dispenser can be processed even if the product dispenser has not established a connection with the network cloud server.

The payment application of the mobile device can be associated with or can include a payment authorization module configured to generate the request to authenticate the mobile application at the network cloud server and to receive the response from the network cloud server. The payment authorization module can be generated at the mobile device using a software development kit (SDK) library.

The product dispenser can be configured to receive from the mobile device, via a wireless communication link, a request to establish a secure connection between the product dispenser and a mobile device. The product dispenser can be configured to transmit to the mobile device, in response to the receipt of the request to establish the secure connection, identification data that uniquely identifies the product dispenser. The mobile device can then use the identification data to obtain authorization of the payment application of the mobile device such that the payment application, once authorized, allows the product dispenser to dispense a product and receives user instructions related to payment for the product. The product dispenser can be a fuel dispenser configured to dispense fuel. Additionally or alternatively to being able to dispense fuel, the product dispenser can be configured to dispense a consumable including at least one of drinking liquid, electricity, air, lottery tickets, and food.

Figure 1:
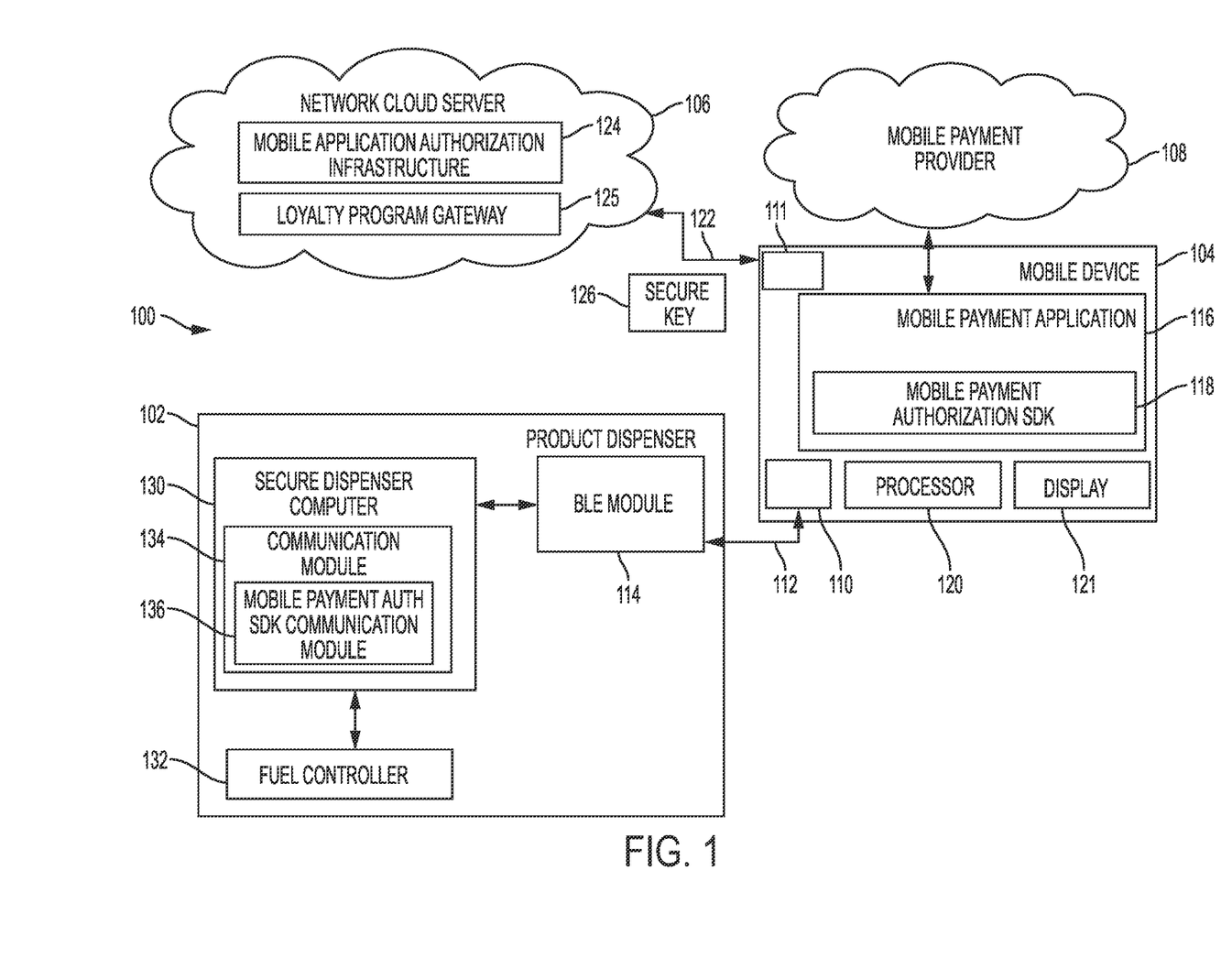
FIG. 1 is a schematic view of one embodiment of a system including a product dispenser and a mobile device.

FIG. 1 illustrates one embodiment of a system 100 including a product dispenser 102 and a mobile device 104 configured to electronically communicate with a network cloud server 106 and with a mobile payment provider 108. The mobile device 104, which can be a phone, a tablet, a laptop, a smartwatch, a device integrated into an automotive vehicle, or other type of mobile device, is configured to communicate with the product dispenser 102 via a communication mechanism 110. In this embodiment, the communication mechanism 110 includes a wireless transceiver, such as a Bluetooth® Low Energy (BLE) transceiver. The communication mechanism 110 is configured to establish a secure connection 112 over a wireless connection between the mobile device 104 and the product dispenser 102. The product dispenser 102, in turn, include a wireless communication link 114, which in this illustrated embodiment is a BLE module. The communication link 114 includes suitable circuitry, interfaces, and code that are configured to transmit and/or receive radio signals over an interface, such as a BLE air interface, and convert the signals to corresponding signals which may be suitable for further processing in a processor of the product dispenser 102. The secure connection 112 between the product dispenser 102 and the mobile device 104 can thus be a connection, e.g., a BLE connection, such that the communication mechanism 110 of the mobile device 104 detects the product dispenser 102 when the product dispenser 102 is in proximity to the mobile device 104. The BLE connection is shown in FIG. 1 by way of example only, as any private wireless network connection can be established.

As shown in FIG. 1, the mobile device 104 also includes a mobile payment application 116, a processor 120, and a display 121, though the mobile device 104 can include other components. The processor 120 can be any suitable processor configured to execute the mobile payment application 116, and the display 121 is a display of any suitable type (e.g., a touch screen display) that is configured to render a user interface provided by the payment application 116. The mobile payment application 116 includes a payment authorization module 118 (also referred to herein as "Mobile Payment Authorization SDK") that is generated using a software development kit (SDK) library of the payment application 116. The payment application 116 can be a payment application installed on computing hardware of the mobile device 104 and configured to be executed by the processor 120 of the mobile device 104. The payment authorization module 118 enables the payment application 116 to be authorized by the network cloud server 106 via a wireless connection 122, regardless of whether or not the product dispenser 102 is connected to the network cloud server 106. As shown in FIG. 1, the mobile device 104 can have a second communication mechanism 111 configured to establish the wireless connection 122 between the mobile device 104 and the network cloud server 106.

In the embodiment of FIG. 1, the network cloud server 106 includes a mobile application authorization infrastructure 124 and a loyalty program gateway 125, though the network cloud server 106 can include other components. In the illustrated embodiment, as discussed in more detail below, the payment authorization module 118 of the mobile device 104 transmits a request to authorize the payment application 116 to the network cloud server 106 and, once the mobile application authorization infrastructure 124 of the network cloud server 106 authorizes the payment application 116, the mobile application authorization infrastructure 124 transmits a secure key 126 to the mobile payment authorization module 118. The payment authorization module 118 then provides the secure key 126, via the secure connection 112 between the mobile device 104 and the product dispenser 102, to the product dispenser 102. The secure key 126 is used in secure communication, via the connection 112, between the mobile device 104 and the product dispenser 102, as discussed in more detail below.

As shown in FIG. 1, the product dispenser 102 includes a secure dispenser computer 130 and a product controller 132 coupled to the secure dispenser computer 130. The secure dispenser computer 130 can be a microcomputer. Regardless of its specific configuration, the secure dispenser computer 130 is configured to instruct the product controller 132 to dispense a product when the payment application 116 of the mobile device 104 is authorized to perform payment for the product. The dispenser computer 130 has a communication module 134 that includes a mobile payment module 136 that is configured to communicate with the payment authorization module 118 of the mobile device 104, via a Bluetooth connection or a private wireless network that is established between the payment authorization module 118 of the mobile payment application 116. In at least some embodiments, the product controller 132 includes iGEM computer electronics which includes a remote-programmable operating system with two-channel, serial communication that can supporting Dart, IFSF and current loop protocols. As in this illustrated embodiment, the product dispenser 102 can be a fuel dispenser, the product can include fuel, and the product controller 132 can be a fuel controller configured to control an amount of fuel dispensed from the fuel dispenser.

The mobile payment module 136, which is configured to communicate with the payment authorization module 118 of the mobile device 104, allows the product dispenser 102 to act as a standalone dispenser for mobile payment transactions that communicates with the mobile device 104 to receive verification (or refusal) of a customer's mobile payment information. As mentioned above, conventional mobile payment approaches depend on an on-site dispenser controller and/or product dispenser authorization by a network cloud infrastructure, such as the network cloud server 106, which requires one or both of the product dispenser and the onsite controller to communicate with the network cloud. The connectivity between the dispenser and the cloud, however, creates intermediary points which may potentially be fraudulently accessed. Conversely, the system 100 of FIG. 1 and other systems disclosed herein provide a secure way for interfacing the mobile device 104, via the mobile payment application 116, directly with the product dispenser 102, thereby allowing payments of different types to be processed. Also, a merchant providing the product dispenser 102 for use in the system 100 may use infrastructure with fewer components and thus of lesser installation and maintenance costs.

As mentioned above, the product dispenser 102 can be caused to dispense a product where payment for which is processed via the mobile device 104 regardless of whether or not the product dispenser 102 has established a connection with the network cloud server 106. In at least some embodiments, the product dispenser 102 is not required to have Internet connectivity for a product dispensing transaction to occur. Thus, the described techniques allow providing a standalone environment for product dispensing (e.g., fueling), in which the product dispenser 102 is autonomous and is caused to operate entirely via the mobile device 104 communicating with the product dispenser 102 via the connection 112. However, the product dispenser 102 can in some embodiments be configured to communicate with the network cloud server 106 and/or one or more other network cloud servers for other purposes. In these embodiments, at least one processor of the product dispenser 102 is configured to execute cloud service software for communication with the network cloud server 106 and/or other network cloud server(s). For example, the product dispenser 102 can include a computing system, such as the Raspberry Pi, the Arduino Uno, or the CHIP computer, that includes a processor and a memory storing the cloud service software executable by the processor. In some embodiments, the product dispenser 102 can have a connection established with the network cloud server 106 and/or other network cloud server(s) and, although the authorization of the mobile application 116 occurs independently of this connection, the product dispenser 102 can receive various information (e.g., media data, etc.) from the network cloud server 106 and/or other network cloud server(s) and/or the product dispenser 102 can communicate with the network cloud server 106 and/or other network cloud server(s) for other reasons (e.g., to receive upgrades, to provide metrics and analytics information to the cloud, etc.).

The mobile payment application 116 can be configured to electronically communicate with the dispenser computer 130 to authorize the dispenser 102 to dispense a product based on an authorized mobile transaction. In this way, the mobile payment application 116 can accept types of payment that could not have been accepted using conventional systems that rely on a connection between the product dispenser 102 and the network cloud server 106. Thus, the mobile payment application 116 can allow a merchant providing the product dispenser 102 to accept any suitable type of payment, such as a credit card, debit card, fleet fueling card, etc. In particular, the SDK library is used to configure the payment authorization module 118 such that the mobile application 116 accepts any type of payment and the merchant can establish a relationship with a corresponding mobile payment provider, such as the mobile payment provider 108 shown in FIG. 1. The dispenser's merchant can thus be enabled to receive payments of one or more suitable types from the mobile payment provider 108.

A merchant providing the product dispenser 102 is allowed to use any desired customer loyalty program. A merchant typically uses one loyalty program associated therewith that can be integrated with a point of sale (POS) system. The embodiments described herein allow the merchant to use multiple customer loyalty programs, including a customer loyalty program that is not associated with the merchant and a customer loyalty program that is associated with the merchant. Accordingly, the payment application 116 of the mobile device 104 can process a payment for a product dispensable from the product dispenser 102 in association with any of one or more customer loyalty programs which would not have been otherwise available to the merchant. In this way, the mobile device 104 can be used to pay for fuel and other products using various payment methods, which can be used in association with any suitable services which a merchant is enabled to provide.

A payment transaction can be performed via the mobile device 104 such that no direct user interaction with the product dispenser 102 is required. There is therefore no need to accept physical payment at the product dispenser 102. The mobile device 104 can begin communicating with the product dispenser 102 once the mobile device 104 detects the product dispenser 102 in proximity to the mobile device 104. For example, as a user has approached the product dispenser 102 and a communication mechanism (e.g., communication mechanism module 110 in FIG. 1) of the mobile device 104 detects the product dispenser 102, a BLE or other short range communication connection 112 is initiated between the user's mobile device 104 and the product dispenser 102. Once the connection 112 is established, the mobile device 104 and the product dispenser 102 communicate to cause a product to be dispensed from the product dispenser 102 and a payment for the product to be processed.

As mentioned above, in at least some embodiments, the mobile device 104 can include a device integrated into an automotive vehicle. For example, a dashboard or other part of a vehicle can have a display configured to present a user interface provided by the mobile application. In this way, the user of the vehicle may perform the payment transaction without having to leave the vehicle.

The product dispenser 102 may not have components required to accept physical payment at the product dispenser 102. A less costly dispenser can thus be utilized, and the entire payment transaction can be conducted via the mobile device 104.

As a person skilled in the art will appreciate, the components shown in FIG. 1 can have numerous variations and they can include other components not illustrated in FIG. 1. For example, in implementations in which a product dispenser has a display, the product dispenser 102 can include a media module is configured to access, e.g., from a network cloud, media services that allow visual and/or audible media to be provided by the product dispenser. The product dispenser 102 can also have other modules, such as a fuel management module, a monitoring and analytics module, and any other modules. Non-limiting examples of modules that can be included in the product dispenser are described in U.S. patent application Ser. No. 15/182,201, filed on Jun. 16, 2016, and entitled "Methods And Devices For Fuel Dispenser Electronic Communication," which is hereby incorporated by reference in its entirety.

Figure 2:
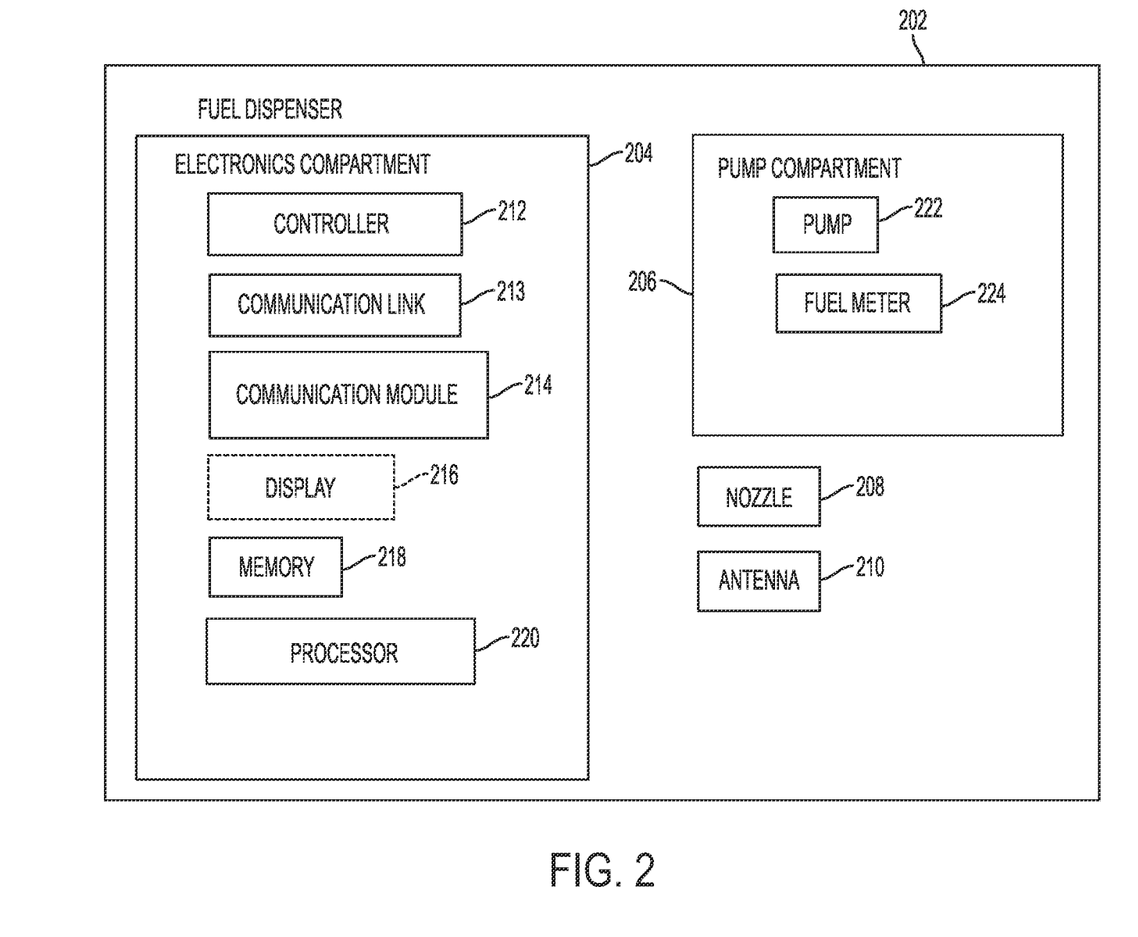
FIG. 2 is a schematic view of one embodiment of a fuel dispenser.

A product dispenser such as the fuel dispenser 102 of FIG. 1 can have various configurations and, as mentioned above, in some implementations the product dispenser includes a fuel dispenser configured to dispense fuel and interact with a mobile device regarding payment for the fuel. FIG. 2 illustrates one embodiment of a fuel dispenser 202 that includes an electronics compartment 204, a pump compartment 206, a nozzle 208, and an antenna 210. The electronics compartment 204 has therein electronics for facilitating payment for the fuel and for facilitating the dispensing of the fuel. The electronics includes a controller 212, a communication link 213 configured to provide wired and/or wireless communication (e.g., with a network cloud), a communication module 214 (e.g., the wireless communication link 114 in FIG. 1) configured to electronically communicate with a mobile device (e.g., the mobile device 104 of FIG. 1), an optional display 216, a memory 218 configured to store data therein, and a processor 220. In at least some embodiments, the fuel dispenser 202 can be configured for mobile payment in addition to payment through a payment terminal (not shown) of the fuel dispenser 202. The processor 220 can be part of the controller 212.

The pump compartment 206 includes a pump 222 configured to pump fuel from a fuel tank or other reservoir and includes a fuel meter 224 configured to monitor fuel flow. The pump compartment 206 can include other elements to facilitate fuel dispensing, such as valves, a vapor recovery system, etc., as will be appreciated by a person skilled in the art. The pump compartment 206 is isolated from the electronics compartment 204 within the fuel dispenser 202 to facilitate safety, security, and/or maintenance, as will be appreciated by a person skilled in the art. Fuel is thus not allowed to flow from the pump compartment 206 to the electronics compartment 204 and instead flows from the pump compartment 206 to the nozzle 208 for dispensing. The nozzle 208 includes one or more nozzles each configured to dispense fuel from the fuel dispenser as pumped therefrom by the pump 222. The antenna 210 is configured to facilitate communication through the communication link 213.

Figure 3:
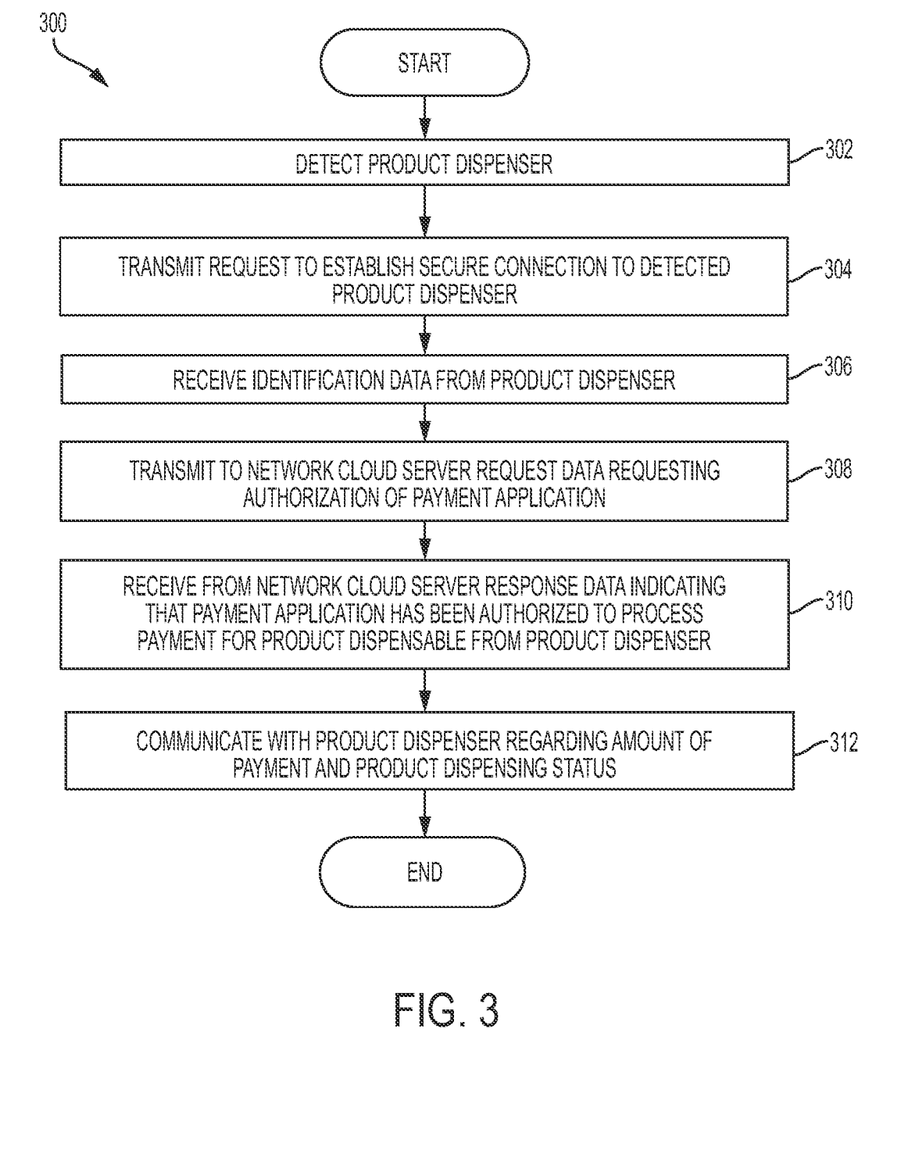
FIG. 3 is a flow chart illustrating one embodiment of a method of operating a mobile device.

FIG. 3 illustrates one embodiment of a process 300 of operating a mobile device, such as the mobile device 104 of FIG. 1. The process 300 can start at any suitable time, for example, when the mobile device detects 302 a product dispenser in proximity to the mobile device. For example, a user of a BLE-enabled mobile device can approach a product dispenser, e.g., on foot, in a vehicle, etc., such that the mobile device is within a range of a BLE beacon of the product dispenser, such as the product dispenser 102 of FIG. 1. A communication mechanism of the mobile device can detect the product dispenser in proximity to the mobile device. The process can start when a mobile payment application on the mobile device is initiated, which can occur in response to the detection of the product dispenser. Alternatively, in some cases, the mobile payment application can be initiated upon another trigger, such as a user input received via a display of the mobile device or in another manner.

Regardless of the way in which the mobile device detects 302 the product dispenser and the process 300 is initiated, the process 300 includes transmitting 304, e.g., via the communication mechanism, a request to establish a secure connection with the product dispenser. In response, the mobile device receives 306 from the product dispenser identification data that uniquely identifies the product dispenser. The process 300 includes transmitting 308 to a network cloud server (e.g., the network cloud server 106 of FIG. 1), via a wireless connection, request data requesting authorization of the payment application of the mobile device. The request data includes the identification data that uniquely identifies the product dispenser. In response to the transmission of the request data, the process includes the mobile device receiving 310 from the network cloud server, via the wireless connection, response data indicating that the payment application has been authorized to process a payment for a product dispensable from the product dispenser. The response data includes a secure key that the processor of the mobile device is configured to use in secure communication between the mobile device and the product dispenser.

Once the payment application is authorized, the mobile device communicates 312 with the product dispenser regarding an amount of payment and status of dispensing of the product from the product dispenser. The mobile device transmits the secure key to the product dispenser, and the processor of the mobile device can use the secure key to decrypt encrypted data received from the product dispenser via the secure connection. As discussed in more detail below, the encrypted data includes status data indicative of at least one of a current status of the product dispenser and an amount of product that has been dispensed via the product dispenser. The communicating 312 includes receiving a total amount of payment for the product dispensable from the product dispenser, for example, via the display of the mobile device, or automatically. The processor of the mobile device is configured to use the secure key to encrypt payment data that is indicative of the total amount of payment, and the encrypted payment data is transmitted to the product dispenser. The process 300 may end when the product dispensing and payment for the product is completed, which can be done automatically or upon activation of a trigger.

Figure 4:
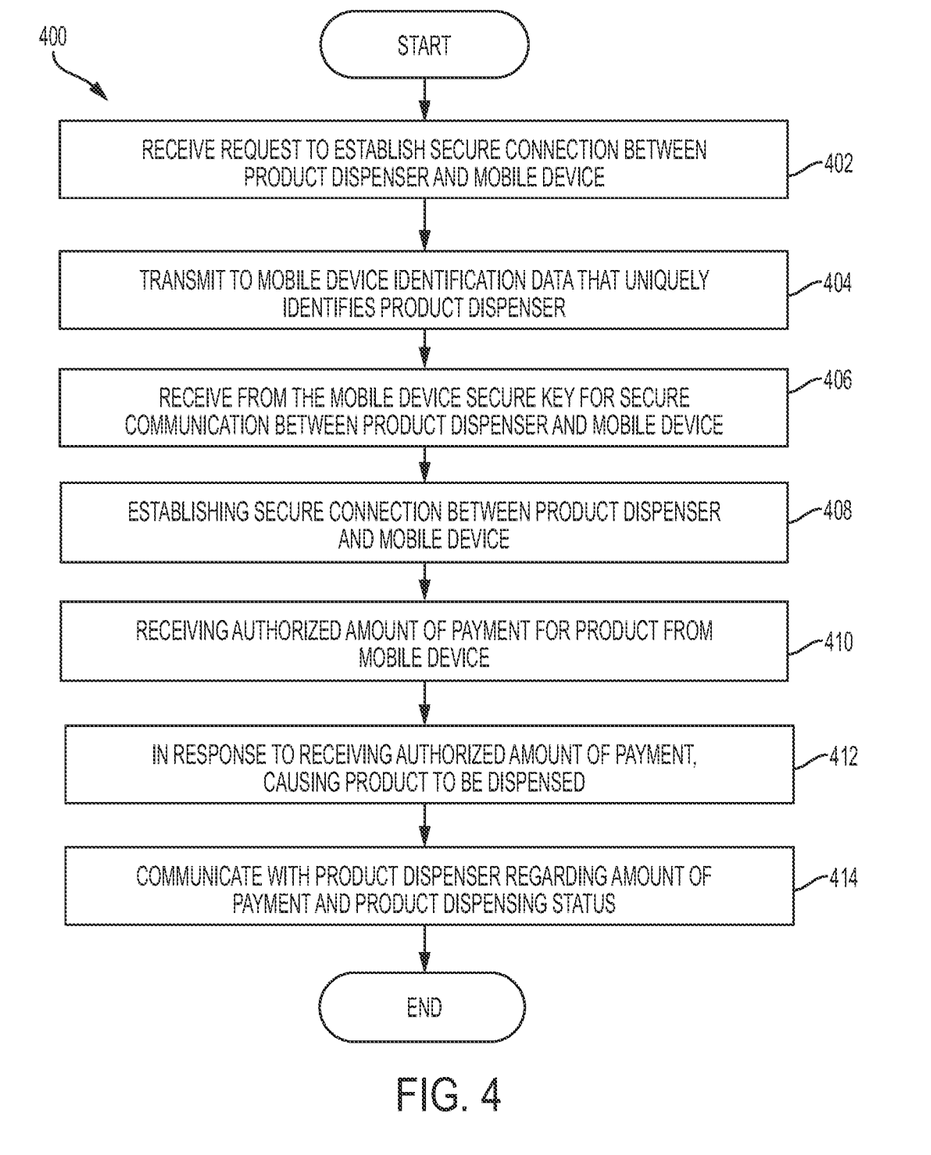
FIG. 4 is a flow chart illustrating one embodiment of a method of operating a product dispenser.

FIG. 4 illustrates one embodiment of a process 400 of using a product dispenser, such as the product dispenser 102 of FIG. 1. The process 400 can start, for example, when a mobile device, such as the mobile device 104 of FIG. 1, detects the product dispenser in its vicinity. The process 400 includes receiving 402 at the product dispenser, via a wireless communication link, a request to establish a secure connection between the product dispenser and the mobile device. In response to the receipt of the request to establish the secure connection, the product dispenser transmits 404 to the mobile device identification data that uniquely identifies the product dispenser. After the request to establish the secure connection is received, the process 400 involves receiving 406 from the mobile device, via the wireless communication link, a secure key for secure communication between the product dispenser and the mobile device. The secure connection between the product dispenser and the mobile device is then established 408, where the secure connection allows communication with the mobile device using the secure key.

Further, the product dispenser receives 410 an authorized amount of payment for a product from the mobile device, where the authorized amount of payment is encrypted using the secure key. In response to receiving the authorized amount of payment for the product, the process 400 further includes causing 412 the product to be dispensed from the product dispenser. The product dispenser communicates 414 with the mobile device regarding an amount of payment and status of dispensing of the product from the product dispenser.

Figure 5A:
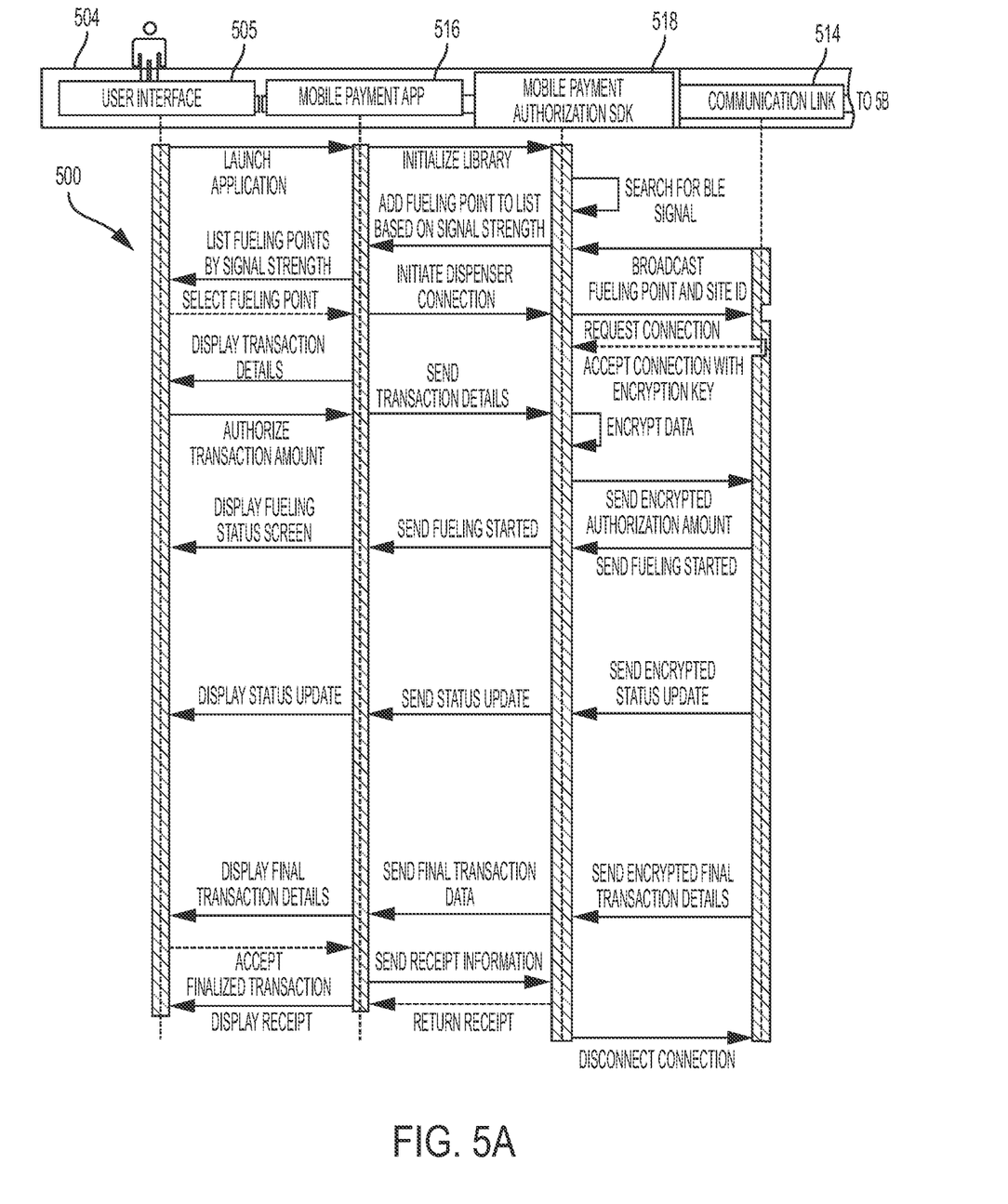
FIG. 5A is first portion of a schematic flow diagram of one embodiment of a mobile device payment transaction with a product dispenser.
Figure 5B:
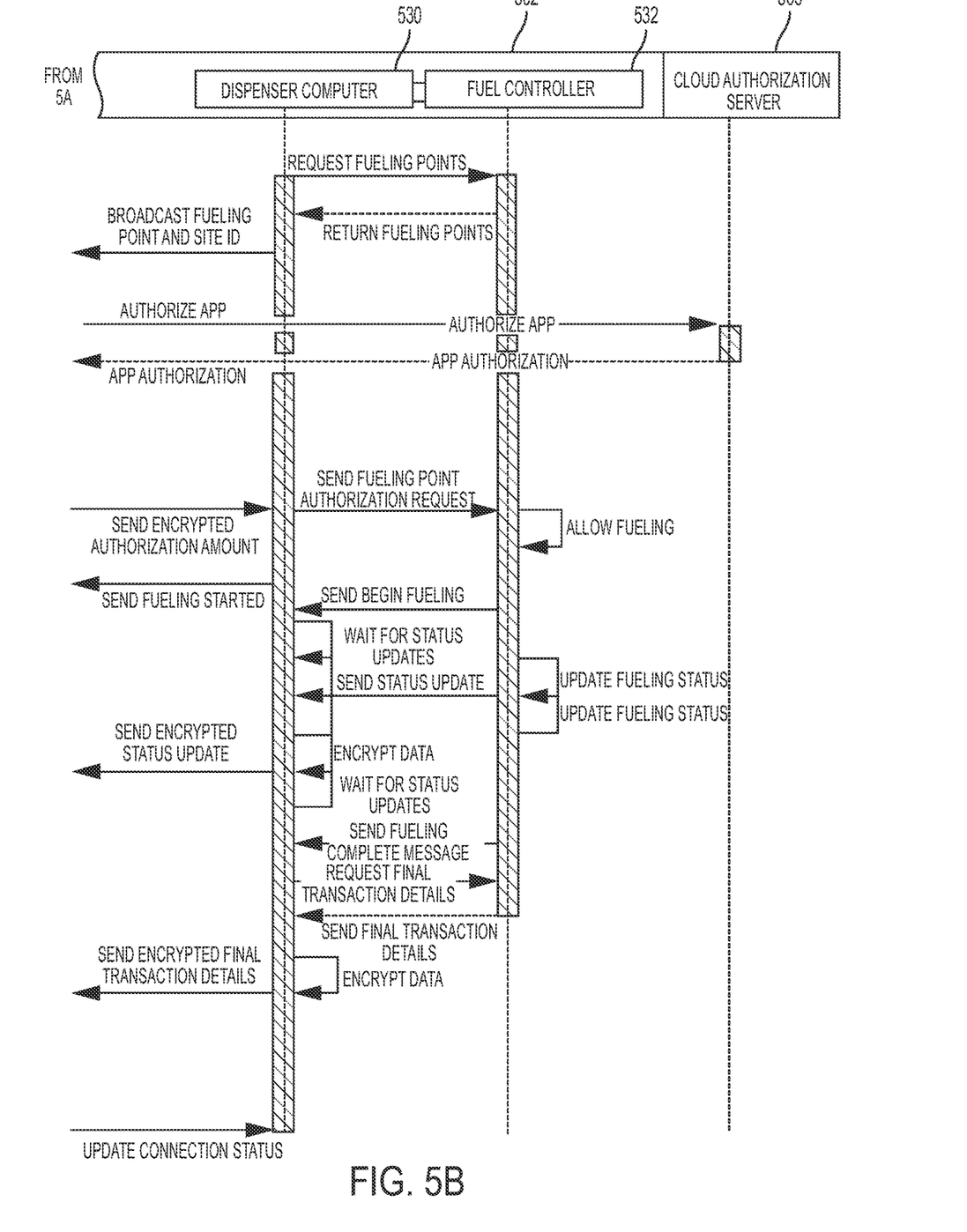
FIG. 5B is a second portion of the schematic flow diagram of FIG. 5A.

FIG. 5A-5B illustrate one embodiment of a process 500 of interaction between a product dispenser 502, a mobile device 504, and a network cloud server 506. The product dispenser 502, mobile device 504, and network cloud server 506 can be, for example, the product dispenser 102, mobile device 104, and network cloud server 106 of FIG. 1, respectively. The product dispenser 502, which in this embodiment is a fuel dispenser configured to dispense fuel, includes a wireless communication link 514, a dispenser computer 530, and a product controller 532. The dispenser computer 530 can be, for example, the dispenser computer 130 of FIG. 1, and has a communication module including a mobile payment module, such as the Mobile Payment Auth SDK Communication Module 136 of FIG. 1. The mobile payment module of the dispenser computer 530 can perform the processing shown in FIGS. 5A-5B. As shown in FIGS. 5A-5B, the mobile device 504 includes a user interface, a mobile payment application 516 (e.g., the mobile payment application 116 of FIG. 1), and a payment authorization module 518 (e.g., the payment authorization module 118 of FIG. 1) that can be generated using a software development kit (SDK) library. As discussed above, the mobile payment application 516 can include the payment authorization module 518. The network cloud server 506 includes a cloud authorization server configured to authorize the mobile payment application 516 of the mobile device 504.

As shown in FIGS. 5A-5B, a user input is received at the mobile device 504, via the user interface 505. The user input instructs the mobile device 504 to start (or launch) the mobile payment application 516. Once the mobile payment application 516 is started, the payment authorization module 518 is initialized and begins searching for a BLE or other connection signal that can be emitted by a product dispenser.

The dispenser computer 530 (its mobile payment module) requests information on available fueling points ("Request Fueling Points") from the fuel controller 532, which responds with appropriate information on the fueling points ("Return Fueling Points"). The information on the available fueling points indicates to the dispenser computer 530 at least one fuel dispenser or point available to dispense fuel. The fuel dispenser 506 can encompass multiple dispensers (and thus multiple pumps), and the fuel controller 532 can therefore control more than one fueling point. Additionally or alternatively, a single fuel dispenser can have multiple pumps (which are separately controlled), and each of the pumps can be referred to as a fueling point. Regardless of the type of one or more identified fueling points, the dispenser computer 530 can transmit, via the wireless communication link 514, the available fueling points and a fueling site ID ("Broadcast Fueling Point and Site ID"). This broadcast information is transmitted, via the communication link 514 of the product dispenser 502 and the communication mechanism of the mobile device, to the payment authorization module 518 of the mobile device 504.

Once the BLE or other connection signal emitted by the fueling point is detected by the mobile device 504, that fueling point (fuel dispenser 502 in this illustrated embodiment) is added to a list of devices for the mobile device 504 to communicate. Only one fueling point (the dispenser 502) is shown in FIGS. 5A-5B for ease of illustration and discussion, but as mentioned above, multiple fueling points can communicate with the mobile device 504. The list of the devices is stored in a memory of the mobile device 504. The fuel dispensers is in the list can be ranked based on the strength of a communication signal between each fuel dispenser and the mobile device. In this way, the mobile device 504 can request a communication to be established between the mobile device 504 and the fuel dispenser that is closest to the mobile device and therefore a signal emitted by that dispenser and detected by the mobile device is stronger than detected signals from other dispensers.

In the illustrated embodiment, as shown in FIGS. 5A-5B, the mobile payment application 516 instructs the user interface 505 on a display of the mobile device 504 to display the information on the available fueling points ("List Fueling Points by Signal Strength"), in conjunction with information on the strength of the signal received by the mobile device from the respective fueling point. The information on the fueling points can be displayed on the user interface 505 in association with other information that can help a customer (e.g., the user of the mobile device 504) to make a decision regarding selection of the fuel dispenser. For example, information on fuel grade and number and/or other identification information on the fueling point can be displayed. Also, the user interface 505 can display suitable prompt(s) requesting user input, which can be presented in any suitable format.

Further, as shown in FIGS. 5A-5B, the user interface receives an input indicating a selection of a fuel dispenser from the displayed list of fueling points ("Select Fueling Point"). The input can be received from the user, although, the fuel dispenser can be selected automatically. For example, the fuel dispenser closest to the mobile device can be selected automatically, or the fuel dispenser can be selected automatically based on other factors (e.g., user preferences that can be known to the mobile payment application 516). In response to the input, the mobile payment application 516 sends a request for initiation of a connection ("Initiate Dispenser Connection") with the selected fuel dispenser to the Mobile Payment Authorization SDK 518. The Mobile Payment Authorization SDK 518 transmits to the communication link 514 of the product dispenser 502 a request to establish a secure connection with the product dispenser 502 ("Request Connection"). For the purposes of the description of this embodiment, the product dispenser 502 can be taken as the fueling point selected based on an instruction received via the user interface 505, or selected in another manner as discussed above. The Mobile Payment Authorization SDK 518 is configured to receive (via the communication mechanism of the mobile device 504) from the product dispenser 502 identification data that uniquely identifies the product dispenser 502, such as a unique fueling point ID code.

The Mobile Payment Authorization SDK 518 transmits, using the processor of the mobile device 504, to the network cloud server 506, via a wireless connection between the mobile device 504 and the network cloud server 506, request data ("Authorize App") requesting authorization of the payment application 516 of the mobile device 504. The request data can include the identification data that uniquely identifies the product dispenser 502. The processor of the mobile device 504, in response to the request data, receives from the network cloud server 506, via the wireless connection, response data ("App Authorization") indicating that the payment application 516 has been authorized to process a payment for a product (fuel, in this embodiment) dispensable from the product dispenser 502. The response data includes a secure key to be used in secure communication between the mobile device 504 and the product dispenser 506. As mentioned above, the secure key is received by the product dispenser regardless of whether or not the product dispenser has established a connection with a network cloud server. If the network cloud server 506 does not authorize the application 516, the response data transmitted from the network cloud server 506 to the mobile device 504 indicates the lack of authorization. The mobile device 504 can display an indication of the failed authorization on the user interface 505, which may prompt the user to try the authorization again or to select another fueling point to be authorized.

As shown in FIGS. 5A-5B, the response data ("App Authorization"), including the secure key, is transmitted from the network cloud server 506 to the Mobile Payment Authorization SDK 518 of the mobile device 504. Further, although not shown in FIGS. 5A-5B, the mobile device 504 transmits the secure key to the product dispenser 502, and the product dispenser 502 receives the secure key. Once the product dispenser 502 receives the secure key (also referred to as the "encryption key"), as shown in FIGS. 5A-5B, the product dispenser 502 transmits a signal ("Accept Connection with Encryption Key") to accept the connection to the mobile device 504. In this way, the secure connection between the product dispenser 502 and mobile device 504 is established. As mentioned above, in at least some embodiments, the secure connection, such as a BLE connection, is established between a communication link (e.g., communication link 114 of FIG. 1) of the product dispenser 502 and a communication mechanism (e.g., communication mechanism 110 of FIG. 1) of the mobile device 504.

Once the secure connection is established between the product dispenser 502 and the mobile device 504, the mobile payment application 516 instructs the user interface 505 to display information ("Display Transaction Details") related to the purchase of the product and payment for the product. The information can include types of products available for dispensing, prices, options to select a certain number of the product items (or product amount), etc. Because in the illustrated embodiment the product is fuel, the information displayed on the user interface 505 includes information related to purchasing the fuel, such as available fuel grades, available additives, prices for various grades and additives, information on the selected fueling point, and other related information. The user interface 505 can also include information associated with the user of the mobile device 504, such as, for example, user preferences, history of using this particular fueling point or this fueling station (e.g., prior purchase information), information on other products that were purchased at this location via the mobile payment application 516, etc. The user interface 505 then receives user input related to selection by the user of one or more options related to the fuel purchase transaction, such as an amount of fuel to be dispensed and/or a total amount of payment for the fuel. Thus, as shown by way of example in FIGS. 5A-5B, the mobile payment application 516 receives from the user interface 505, along with other information, an authorized transaction value or amount ("Authorize Transaction Amount") indicating the total amount of payment for the fuel.

The mobile payment application 516 sends data with transaction details ("Send Transaction Details"), including the authorized transaction amount, to the Mobile Payment Authorization SDK 518 that encrypts the data ("Encrypt Data") using the secure key. The Mobile Payment Authorization SDK 518 then transmits the encrypted data, including the encrypted authorized transaction amount ("Send Encrypted Authorization Amount"), via the mobile device's communication mechanism, to the communication link 514 of the product dispenser 502. The communication link 514 provides the encrypted data to the dispenser computer 530, which decrypts the data using the secure key and then transmits a control signal ("Send Fueling Point Authorization Request") to the fuel controller 532 to cause the fuel controller 532 to dispense fuel ("Allow Fueling") from the fuel dispenser 502. In this way, the dispenser computer 530 authorizes the fuel controller 532 to dispense the amount of product which can be purchased using the transaction amount.

As the fuel controller 532 starts dispensing the fuel, the fuel controller 532 transmits a respective signal ("Send Begin Fueling") to the dispenser computer 530. The information on the start of the fueling is transmitted ("Send Fueling Started") to the mobile payment application 516, which causes the information to be displayed ("Display Fueling Status Screen") on the user interface 505 of the mobile device 504.

As the fuel dispensing starts and progresses, the dispenser computer 530 monitors ("Wait for Status Updates") status of the fueling indicating a current status of the product dispenser 502. The fuel controller 532 updates ("Update Fueling Status") the fueling status and provides ("Send Status Update") respective updates to the dispenser computer 530. As it receives one or more fueling status updates, the dispenser computer 530 encrypts ("Encrypt Data") the status update information and transmits the encrypted status update data ("Send Encrypted Status Update") to the Mobile Payment Authorization SDK 518 of the mobile device 504. The Mobile Payment Authorization SDK 518 decrypts the encrypted status update data using the secure key and provides ("Send Status Update") the decrypted status update data to the mobile payment application 516 that causes information on the fueling status to be displayed ("Display Status Update") on the user interface 505.

As the fuel dispensing progresses further, and as the dispenser computer 530 continues monitoring the status of the fueling, the fuel controller 532 sends ("Send Fueling Complete Message") a signal to the dispenser computer 530 indicating that the fuel dispensing is completed. As shown in FIGS. 5A-5B, when the fuel dispensing is completed, the dispenser computer 530 requests ("Request Final Transaction Details") information on the transaction from the fuel controller 532, and, in response to the request, the fuel controller 532 provides ("Send Final Transaction Details") such information to the dispenser computer 530. The dispenser computer 530 encrypts ("Encrypt Data") the received final fueling transaction information and transmits ("Send Encrypted Final Transaction Details") to the Mobile Payment Authorization SDK 518 of the mobile device 504. If the amount of the dispensed fuel does not correspond to the authorized transaction amount (e.g., more or less fuel has been dispensed than would have been dispensed given the authorized amount), the fueling transaction information indicates this discrepancy to the mobile payment application 516, and the mobile payment application 516 is used to resolve the discrepancy. The Mobile Payment Authorization SDK 518 decrypts the encrypted fueling transaction information using the secure key and provides ("Send Final Transaction Data") the corresponding decrypted information to the mobile payment application 516 that, in turn, causes the fueling transaction information to be displayed ("Display Final Transaction Details") on the user interface 505.

The user interface 505 displays the fueling transaction information in a manner that allows receipt of user input with respect to the displayed information. For example, a user input indicating the user's approval of the fuel dispensing transaction (e.g., the amount of the dispensed fuel and the amount of payment for the dispensed fuel) can be received ("Accept Finalized Transaction") via the user interface 505. In the illustrated embodiment, as the mobile payment application 516 receives such information, the mobile payment application 516 transmits receipt information to the Mobile Payment Authorization SDK 518, as shown in FIGS. 5A-5B. The Mobile Payment Authorization SDK 518 communicates with a mobile payment provider (e.g., the mobile payment provider 108 of FIG. 1) regarding payment for the fuel. As a result, the Mobile Payment Authorization SDK 518 returns ("Return Receipt") receipt information to the mobile payment application 516, and the mobile payment application 516 causes the receipt information to be displayed ("Display Receipt") on the user interface 505.

When the fuel dispensing and payment for the fuel are completed, the secure connection between the mobile device 504 and the product dispenser 502 can be terminated. This can occur automatically when the fuel dispensing and payment for the fuel are completed. Also, the connection can be ceased if the product dispenser 502 is no longer within the range of the communication mechanism of the mobile device 504. As another example, the user interface 505 of the mobile device 504 can receive an instruction instructing the mobile payment application 516 to disconnect from the product dispenser 502. Regardless of how the termination of the connection between the mobile device 504 and product dispenser 502 is triggered, the Mobile Payment Authorization SDK 518 transmits ("Disconnect Connection") a signal to the communication link 514 of the product dispenser 502, the signal indicating that the connection between the mobile device 504 and the product dispenser 502 has been terminated. The communication link 514 then informs ("Update Connection Status") the dispenser computer 530 that the secure connection between the product dispenser 502 and the mobile device 504 has been disconnected.

In some instances, the secure connection between a product dispenser and a mobile application executed on a mobile device 504 can be interrupted after product dispensing has begun. If the interrupted connection is not re-established by the time the product dispensing is completed, the product dispenser can finalize a payment transaction to complete payment for the dispensed product in an alternative way. For example, the product dispenser can electronically communicate with a network cloud server (e.g., the network cloud server with which the mobile device communicates or another network cloud server), which can be done by establishing a direct connection between the product dispenser and the network cloud server or via a mobile payment application (a payment authorization module, such as the Mobile Payment Authorization SDK 118 of FIG. 1) of a next customer having a mobile device establishing a subsequent secure connection with the product dispenser. Accordingly, the product dispenser can be configured to, in response to detecting that the secure connection between the product dispenser and the mobile device has been interrupted and not re-established at a time when the product dispensing is completed, establish an alternative connection to complete the dispensing of the product.

Figure 6:
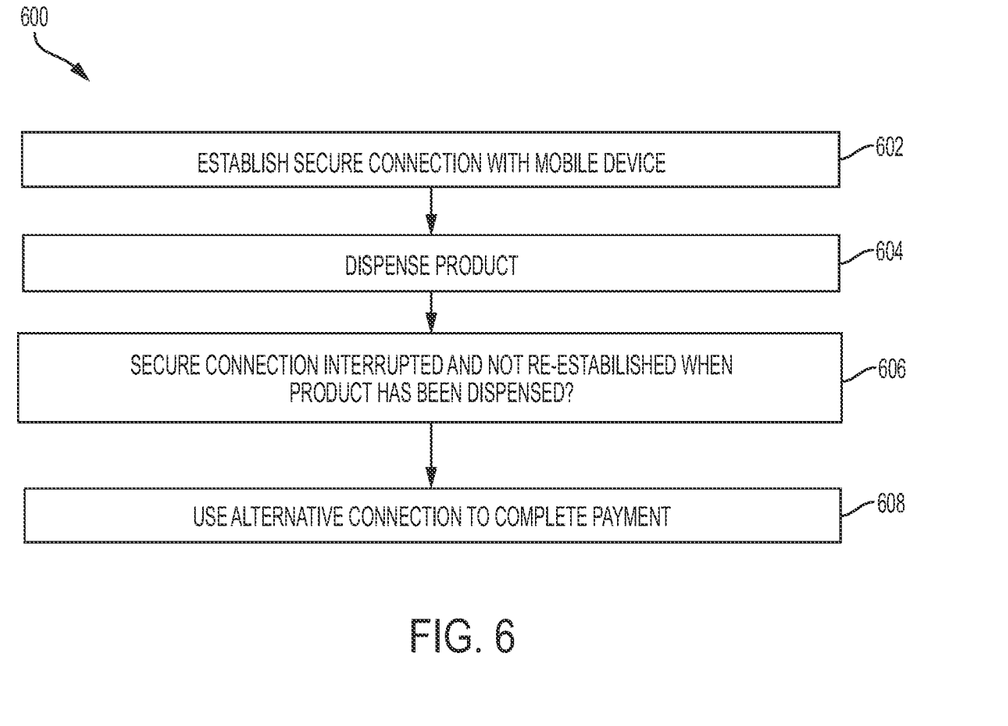
FIG. 6 is a flow chart illustrating one embodiment of a method of operating a product dispenser when a secure connection between the product dispenser and a mobile device has been prematurely interrupted.

FIG. 6 illustrates one embodiment of a process 600 of operating a product dispenser (e.g., product dispenser 102 of FIG. 1, product dispenser 502 of FIGS. 5A-5B, or any other product dispenser described herein) to establish an alternative connection when a secure connection between the product dispenser and a mobile device does not exist when product dispensing is completed. In the process 600, the secure connection between the product dispenser and the mobile device is established 602 and then the product is dispensed 604, as described above. If it is determined 606 that the secure connection between the product dispenser and the mobile device has been interrupted and not re-established by the time the product has been dispensed, an alternative connection is used 608 to complete payment for the dispensed product. The alternative connection can be established in various ways. For example, as mentioned above, in some embodiments, the product disperser can communicate with the network cloud server with which the mobile device communicates to complete the payment transaction. In some embodiments, a direct connection between the product dispenser and the network cloud server can be established and used to complete the payment transaction. Alternatively, in other embodiments, the product dispenser can communicate with the network cloud server indirectly via a payment authorization module (e.g., Mobile Payment Authorization SDK 118 of FIG. 1 or Mobile Payment Authorization SDK 518 of FIGS. 5A-5B) of another mobile device that establishes a secure connection with the product dispenser. In this way, the payment transaction can be completed without user intervention.

Accordingly, the methods and devices described herein may provide for authorization of a product dispenser via a mobile payment application of a mobile device that establishes a secure connection with the product dispenser. Because the mobile application is authorized by a network cloud server regardless of whether or not a connection is established between the product dispenser and the network cloud server, the product dispenser can operate as a stand-alone system that only requires a connection between the product dispenser and the mobile device. The mobile payment application thus interacts directly with the product dispenser, which allows additional payment methods become available to customers. Also, a merchant providing the product dispenser is enabled to offer additional services to customers. For example, while a customer loyalty program associated with the merchant can be offered, additionally, the mobile payment application can process payments in association with one or more customer loyalty programs that are not associated with the merchant. Thus, multiple loyalty programs, which were not conventionally available, can be offered to customers.

A product disperser, such as a fuel dispenser, described herein may be manufactured with less cost. In particular, because the entire process of payment for the product available for dispensing can be performed via a mobile device, the product dispenser may not include components required for accepting physical payment at the product dispenser. Thus, the product dispenser may not have a keypad, one or more components (e.g., card reader(s)) for receiving a credit card, smart card, a mobile wallet (e.g., on a mobile device) communicating with a product dispenser via NFC (near-field communication) or RFID (radio-frequency identification) communications, etc. Other related components, such as a printer to print paper receipts, will not be required either. Furthermore, the product dispenser may not include fuel grade selection buttons, and other components that are required for manual input of instructions to the product dispenser.

Figure 7:
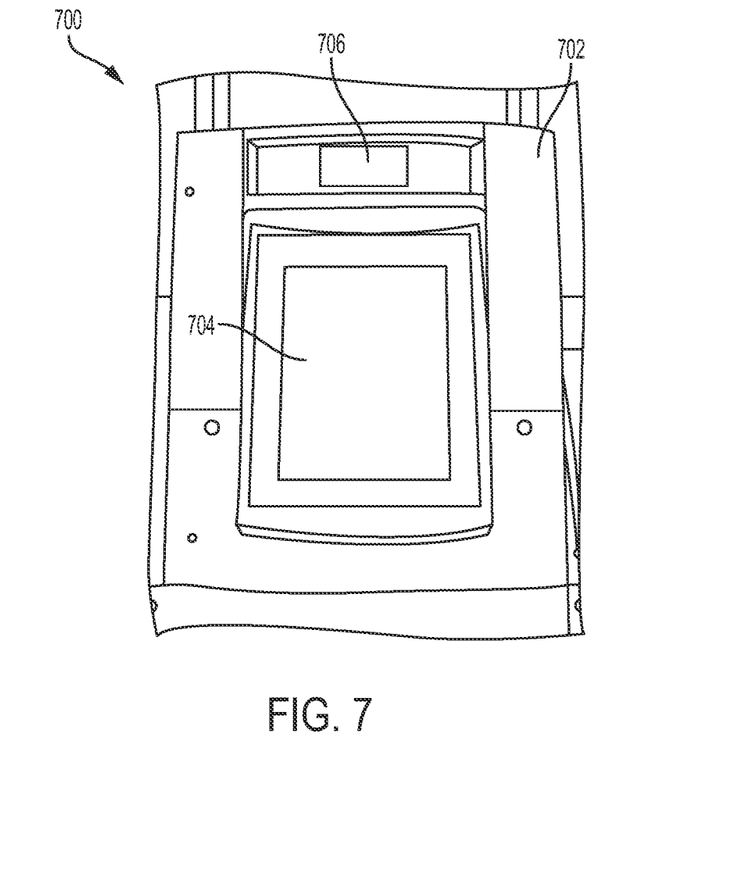
FIG. 7 is a schematic view of one embodiment of a portion of a fuel dispenser.

FIG. 7 shows one embodiment of a product dispenser 700, in this illustrated embodiment a fuel dispenser, which does not have components for accepting payments through physical components of the product dispenser. As shown, a front panel 702 of the product dispenser 700 includes a display 704 which can display various information related to product dispensing, or other information such as, for example, media information. The product dispenser 700 can have a second display 706 configured to display information on a progress of a product dispensing (e.g., fuel dispensing) or other information. In some embodiments, the product dispenser can include only one of the displays 704, 706, or the product dispenser may not have any displays. This allow manufacturing less expensive product dispensers that do not require connection with a network cloud server, which can be particularly advantageous in remote locations and in locations with increment weather.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A fuel purchasing method, comprising:
providing a user interface on a display of a mobile device, wherein the user interface shows information including fuel grades available for dispensing from a fuel dispenser;
receiving, via the user interface, a user selection of one of the fuel grades available for dispensing from the fuel dispenser;
receiving, via the user interface, a user authorization of an amount of fuel having the selected one of the fuel grades to be dispensed from the fuel dispenser;
communicating from the mobile device to a network cloud server a payment amount for the user authorized amount of fuel having the selected one of the fuel grades;
receiving, at the mobile device from the network cloud server, authorization for the payment amount and a secure key;
determining, by the mobile device and based on the amount of fuel and the selected one of the fuel grades, a request to begin the dispensing of the amount of fuel having the selected one of the fuel grades;
encrypting, by the mobile device and using the secure key, the request; and
in response to receiving the authorization, transmitting the encrypted request from the mobile device to the fuel dispenser, thereby triggering the fuel dispenser to dispense the amount of fuel having the selected one of the fuel grades.

2. The method of claim 1, wherein the fuel dispenser cannot directly communicate with the network cloud server.

3. The method of claim 1, wherein the fuel dispenser does not allow manual user input thereto to select fuel grade.

4. The method of claim 1, wherein the fuel dispenser does not accept physical payment for fuel dispensable from the fuel dispenser.

5. The method of claim 1, further comprising, in response to receiving the authorization, communicating the payment amount to the fuel dispenser.

6. The method of claim 1, further comprising establishing a secure connection between the fuel dispenser and the mobile device that allows secure communication between the fuel dispenser and the mobile device;
wherein the user interface is provided on the display of the mobile device after the secure connection is established; and
the amount of fuel and the selected one of the fuel grades is communicated over the secure connection.

7. The method of claim 1, wherein the mobile device comprises one of a phone, a tablet, a laptop, a smartwatch, and a device integrated into an automotive vehicle.

8. A fuel purchasing system, comprising:
a mobile device comprising:
- a display configured to provide thereon a user interface configured to
  - show information including fuel grades available for dispensing from a fuel dispenser,
  - receive a user selection of one of the fuel grades available for dispensing from the fuel dispenser, and
  - receive a user authorization of an amount of fuel having the selected one of the fuel grades to be dispensed from the fuel dispenser;
- a first communication mechanism configured to communicate to a network cloud server a payment amount for the user authorized amount of fuel having the selected one of the fuel grades and configured to receive from the network cloud server authorization for the payment amount and a secure key;
- a data processor configured to determine a request to begin the dispensing of the amount of fuel having the selected one of the fuel grades and to encrypt the request using the secure key; and
- a second communication mechanism configured to transmit the encrypted request from the mobile device to the fuel dispenser, thereby triggering the fuel dispenser to dispense the amount of fuel having the selected one of the fuel grades.

9. The system of claim 8, further comprising the fuel dispenser;
wherein the fuel dispenser cannot directly communicate with the network cloud server.

10. The system of claim 8, further comprising the fuel dispenser;
wherein the fuel dispenser does not allow manual user input thereto to select fuel grade.

11. The system of claim 8, further comprising the fuel dispenser;
wherein the fuel dispenser does not accept physical payment for fuel dispensable from the fuel dispenser.

12. The system of claim 8, wherein the second communication mechanism is configured to, in response to receiving the authorization, communicate the payment amount to the fuel dispenser.

13. The system of claim 8, wherein the second communication mechanism is configured to, before the user interface shows the information, communicate to the fuel dispenser a request for a secure connection with the fuel dispenser; and
the amount of fuel and the selected one of the fuel grades is communicated over the secure connection.

14. The system of claim 8, wherein the mobile device comprises one of a phone, a tablet, a laptop, a smartwatch, and a device integrated into an automotive vehicle.

15. A fuel purchasing method, comprising:
transmitting, from a mobile device to a network cloud, a request for fuel payment authorization;
receiving, at the mobile device, a response from the network cloud indicating that the mobile device is authorized for fuel payment, the response including a secure key; and
in response to receiving the response, transmitting, from the mobile device to a fuel dispenser, a request to begin fueling, the request being encrypted with the secure key by the mobile device, and the request allowing the fuel dispenser to begin dispensing fuel.

16. The method of claim 15, wherein the transmission of the request for fuel payment authorization, the receipt of the response, and the transmission of the request to begin fueling occur whether or not the fuel dispenser has established a connection with the network cloud.

17. The method of claim 15, further comprising, prior to the transmission of the request for fuel payment authorization, establishing a secure connection between the mobile device and the fuel dispenser; and
after establishing the secure connection, receiving at the mobile device from the fuel dispenser information regarding the fuel dispenser;
where the request for fuel payment authorization includes the information regarding the fuel dispenser.

18. The method of claim 15, wherein the request to begin fueling includes a total amount of payment for fuel authorized by the network cloud.

19. The method of claim 15, wherein the fuel dispenser does not accept physical payment for fuel dispensable from the fuel dispenser.

20. The method of claim 15, wherein the mobile device comprises one of a phone, a tablet, a laptop, a smartwatch, and a device integrated into an automotive vehicle.

* * * * *